United States Patent [19]

McKagen

[11] Patent Number: 4,627,632
[45] Date of Patent: Dec. 9, 1986

[54] CYCLE SUSPENSION SYSTEM

[76] Inventor: Ollie H. McKagen, Rte. 3, Box 264, Blacksburg, Va. 24060

[21] Appl. No.: 760,179

[22] Filed: Jul. 29, 1985

[51] Int. Cl.⁴ .............................................. B62K 11/12
[52] U.S. Cl. .................................... 280/276; 180/219; 280/279; 280/286
[58] Field of Search ............... 280/275, 276, 277, 279, 280/283, 284, 270, 286, 660; 180/219

[56] References Cited

U.S. PATENT DOCUMENTS

| 1,132,771 | 3/1915 | Handy | 280/270 |
| 4,179,135 | 12/1979 | Slater | 280/276 |
| 4,388,978 | 6/1983 | Fior | 280/275 |
| 4,526,249 | 7/1985 | Parker | 280/275 |
| 4,540,189 | 9/1985 | Tanaka | 280/270 |

FOREIGN PATENT DOCUMENTS

| 2418742 | 11/1979 | France | 280/277 |
| 2539375 | 7/1984 | France | 280/276 |

Primary Examiner—John J. Love
Assistant Examiner—Everett G. Diederiks, Jr.
Attorney, Agent, or Firm—Witherspoon & Hargest

[57] ABSTRACT

A suspension system for the front wheel of a motorcycle having a frame assembly for supporting the suspension system, which includes a pair of upright bars having upper and lower ends and adapted to rotatably mount a wheel between their lower ends, a brace assembly is attached to said bars adjacent the upper ends thereof to hold the bars in spaced and parallel position, a parallelogram mechanism is affixed to the cycle frame and to the pair of upright bars to control up and down movement and to allow rotary movement of said pair of bars, a pair of semi-handlebars are movably mounted on the cycle frame, and a steering linkage operatively connects each semi-handlebar with the bar pair, both linkages pivot about a common pivot pin whereby the pair of bars may be rotated by movement of either semi-handlebar independent of the other semi-handlebar.

7 Claims, 8 Drawing Figures

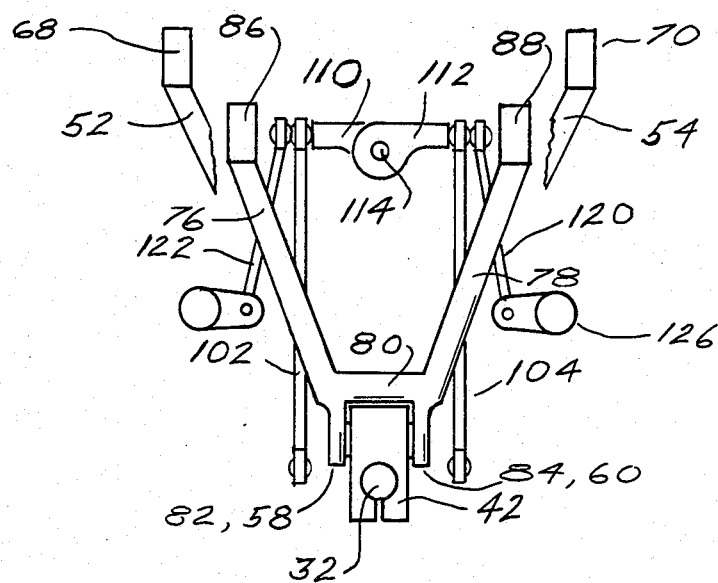
Fig 6
Fig 5
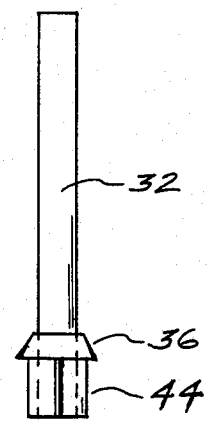
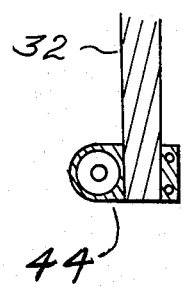

CYCLE SUSPENSION SYSTEM

This invention relates to cycle suspension systems and more particularly to a linkage type front suspension embodying an independent semi-bar arrangement.

BACKGROUND AND OBJECTS

Linkage type front suspensions were prominent in motorcycling's early days, and have long been recognized for some real advantages over the common telehydraulic fork. But, like forks, most linkage systems have a vital downfall: they are hung from a steering head which is a long way from the axle.

One answer to fork problems is the Hossac system found on a road racer in England. Although it has the same functions as any other system, the elements are combined differently, to place the suspension between the steering head and main frame. This method appeared as a pure parallelogram linkage on cycles over fifty years ago. Advantages include rigidity (the A-arm supports are triangulated and overhang ratio is low), reduced steering inertia (the upright weighs one third of a fork), progressive action (with the supports as linkage), and low friction (no sticky sliders). Also, there are no mechanical limits on either travel or lock. It is a commendable effort, but the original suffered from steering-suspension interaction even with small displacements.

The original design had an angle between the handlebar axis (set approximately vertical) and the upright axis (set at rake angle). Thus some component of the motion of the upright ends of the linkage is one up, one down relative to the plane containing the handlebar ends, as well as back and forth.

This out-of-plane displacement changes the effective length of any sort of linkage. During superimposed suspension motion, there is relative angular displacement of the handlebars and upright: bump steering. This can eliminated by mounting the handlebar axis parallel to the upright axis, an impossible condition because the axis cannot be positioned far enough forward to place the grips properly for the rider at this tilt. The supports are in the way. Moving the grips forward relative to their axis results in the rider pulling back and out rather than in; non-ergonomic. It's a marginal condition even with the vertical axis. However, add a bellcrank the axis of which *is* parallel to the upright, and link it to both upright and handlebars. This removes out-of-plane displacements from the suspended portion of the linkage. Angularity effects are now found only between the handlebars and the bellcrank where there is no relative suspension motion. Therefore there is no bump steer from any linkage component. However, the angularity still causes a change in effective length of the links on the handlebar side of the bellcrank, which shows up as a strain there. Now it is necessary to mount the handlebars as two halves, each semi-bar on its own hinge, to relieve this strain. It becomes a change in included semi-bar angle with increased steering motion. Each handgrip then is slightly "progressive": i.e. increments of motion one way move the upright more than increments the other way. (If you view the rider's arms as links on the bars of a fork, it will be seen that some progression occurs there also.) By choosing pivot offsets appropriately the effect was tailored to the make the semi-bar on the inside of the turn fold back significantly. Another facet of the opposed progression is that pulling back, as on uphills, quickens the steering; corollary downhills or braking would make it more stable. This seemingly desirable trend is in direct opposition to fork behavior. Similar offsets at the upright made the overall steering a bit quicker at the extremes, thus a bit self-centering; a trait of some value for a big-bore of 53 inch wheelbase and steep rake.

When the supports are non-parallel, another complexity emerges. In this case the two upright links must pivot concentrically with one support, another mechanical impossibity. Otherwise some extra freedom must be introduced into this part of the linkage to prevent suspension movement from straining it. This would hinder motion and likely break components. Hossac allowed one set of pivots to float freely to relieve the strain. In the present case the bellcrank must be divided into two parts mounted concentrically, each now connected independently to the linkages. The errant geometry is then reflected all the way up and becomes a slight "waggle" at the bars as suspension works.

It must be remembered that with nonparallel supports the rake angle varies slightly, here between 26.5° and 27.5°. Thus there is still some bump steer. It is about 0.2° in over ten inches of full travel. The corresponding "waggle" is about 0.1 inch at the grip. Neither would be noticed by a casual rider.

Also, on conventional forks the rider is really twisting them, especially when standing. Because in a linkage system the orientation of the hinges does not depend on the rake angle, they may be placed so the rider more truly pushes and pulls them.

Evidently the major part of the designing such a front end system goes into finding advantages in the necessarily complex steering linkage. Once done, a number of advantages are enjoyed such as: adjustable steering and independent semi-bar progression, elimination of bump steering, compensation for geometry, and lateral reorientation of steering axes to suit rider stance. All of that is achieved in the independent semi-bar concept of this invention.

The U.S. Pat. Nos. 4,388,978 to Frior and 4,179,135 to Slater are herewith incorporated by reference for their showing of suspension systems in motorcycles. For purposes of uniformity the following definitions are set forth. Ther terms "front" and "rear" refer to the normal direction of movement of the cycle. The "longitudinal median plane" of the cycle is defined as the average or middle plane containing the front and rear cycle wheels (this plane being vertical when the cycle moves along a straight line). The "transverse direction" is the direction perpendicular to the longitudinal median plane. A transverse plane is a plane containing a transverse direction (therefore orthogonal to the longitudinal median plane). The "caster angle" is defined in the usual sense as the angle formed between the vertical and the axis around which rotation occurs for steering the vehicle. The "rest position" or "rest attitude" of the cycle is the position of the cycle when it is subjected only to the forces of gravity (at stop or at a constant speed and in a straight line).

The foregoing objects and advantages will become more apparent when taken in conjunction with the following detailed description and drawings showing by way of example a preferred embodiment of this invention.

DESCRIPTION OF DRAWINGS

FIG. 5 is an elevational view of the steering stem and associated bearings and brackets, FIG. 6 is a top plan view of the support arms and steering linkage.

DETAILED DESCRIPTION OF THE INVENTION

Figure 1:
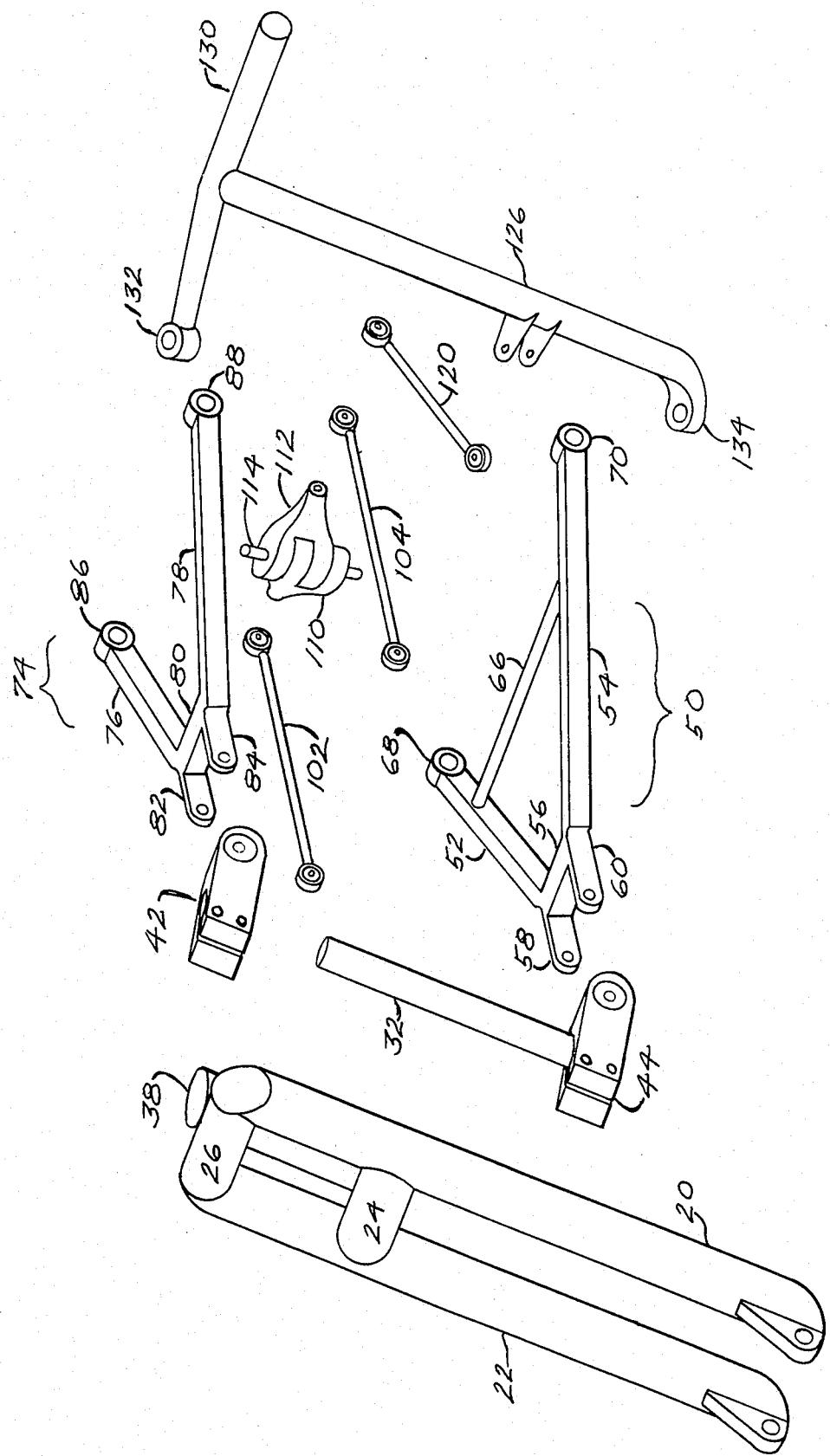
FIG. 1 is an exploded view showing the essential components of the suspension system of this invention as laid out for use connection with a motorcycle.
Figure 3:
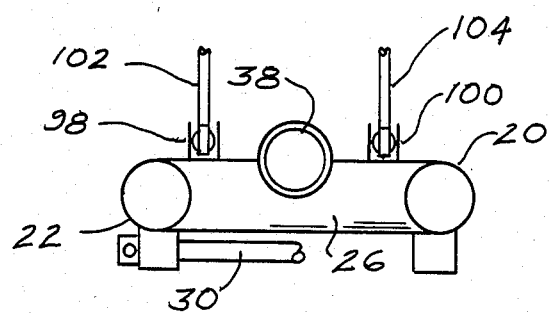
FIG. 3 is a front top plan view of the two upright bars and their association with the steering tube.
Figure 4:
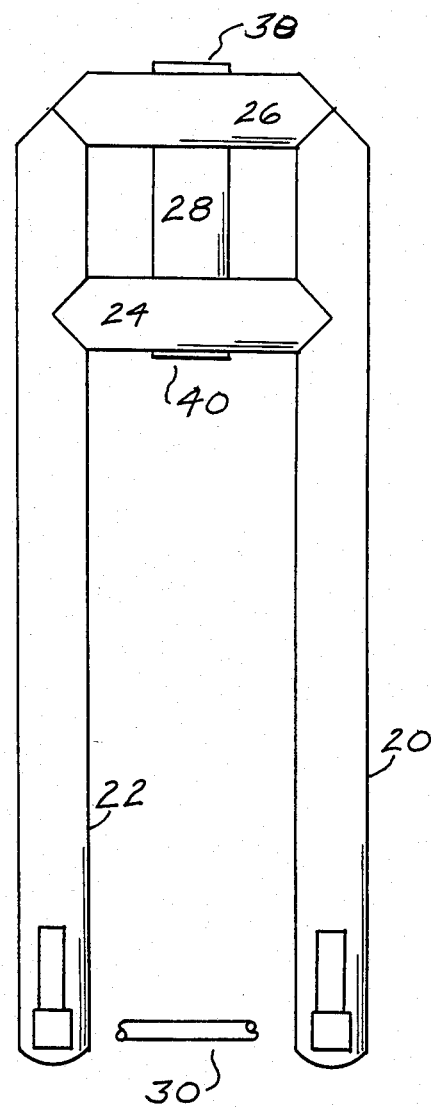
FIG. 4 is a front elevational view of the upright bar assembly including the steering tube.
Figure 7:
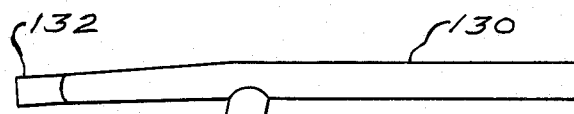
FIG. 7 is an elevational view of the bell crank combination.

As best illustrated in FIGS. 1, 3 and 4, the suspension system comprises a pair of spaced upright bars 20 and 22 held in spaced and fixed position by cross members 24 and 26 which it turn support offset steering tube 28 therebetween. The lower ends of upright bars 20 and 22 are provided with means to receive an axle 30 adapted to mount a front wheel.

Figure 2:
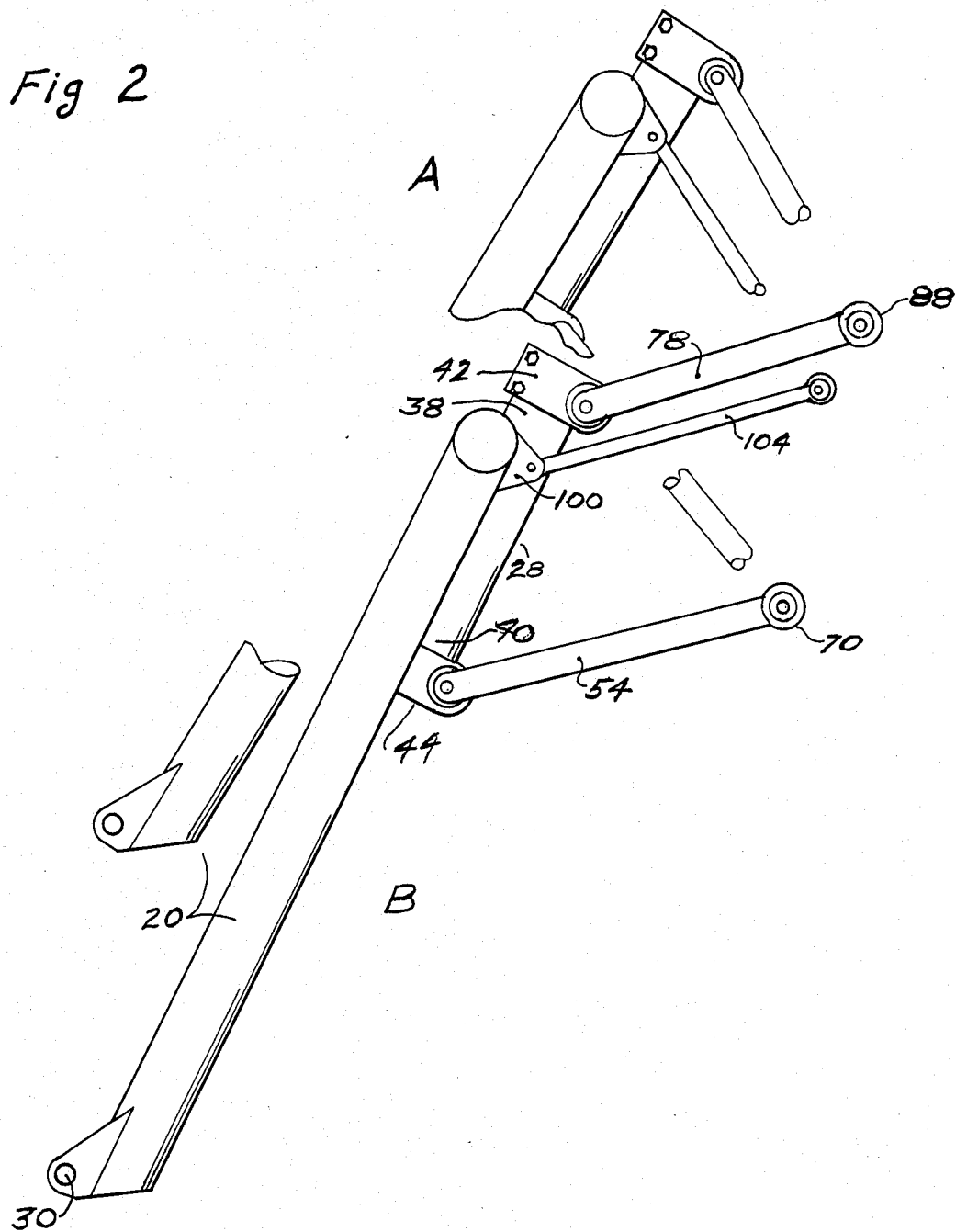
FIG. 2 is an elevational side view illustrating the relationship of the support arms to the upright bars in the full extension and full compression positions.

Referring to FIGS. 3, 4 and 5, the steering stem 32 is rotatably carried within steering tube 28 by means of suitable bearings 34 and 36 mounted on opposite ends of steering stem 32 and adapted to cooperate with bearing support means 38 and 40 on the steering tube 28. An upper offset block 42 is affixed to the upper end portion of steering stem 32 while a lower offset block 44 is carried by the lower end portion of the aforesaid steering stem. Both blocks are apertured and provided with pivot bearings for rotational connection purposes. As best shown in FIGS. 1 and 2, the lower support 50 comprises a pair of arms 52 and 54 held in spaced position by cross piece 56 so that one pair of apertured parallel lugs 58 and 60 with pivot bearings therein are spaced to fit on both sides of lower offset block 44 for securement thereto by means of bolt and nut 62 and 64. The pivot bearings in the aperture of the offset block 44 and those in apertures of the parallel lugs 52 and 54 serve to rotatably carry bolt 62. The opposite portions of the arms 52 and 54 extend outwardly and away from the lugs and are held in such position by cross brace 66. The ends of said opposite portions are provided with bearing members 68 and 70, each having a hole therethrough aligned with the other. These bearing members 68 and 70 are pivotally mounted on appropriate portions of the cycle frame to allow vertical swinging thereof about the axis formed by the aforesaid aligned bearing holes.

The upper support 74 is constructed similarly to the lower support 50 and comprises upper support arms 76 and 78 connected by cross piece 80. A pair of apertured lugs 82 and 84, provided with pivot bearings are formed on one set of ends and are pivotally secured to upper offset block 42 by means of rotatable bolt 90 and nut 92. The other end portions of the arms are flared outwardly to mount bearings 86 and 88, each having a hole therethrough aligned with the other. These bearings 86 and 88 are pivotally mounted on appropriate portions of the cycle frame to allow vertical swinging of the aforementioned parts within the medial longitudinal plane of the cycle.

The construction so far described, is shown in FIG. 2 wherein lower support arms and upper support arms which are held in generally spaced parallel position control the full compression and full extension of the linkages, the fully compressed position indicated at "A" and the full extended position at "B". The aforesaid structure controls up and down movement of the steering unit. More particularly the lengths of the members of the parallelogram mechanism and their respective pivot points on the cycle frame and pair of bars is such that the angle of the bars with respect to the ground varies less than 1½ degrees throughout the fall range of vertical travel thereof.

Figure 8:
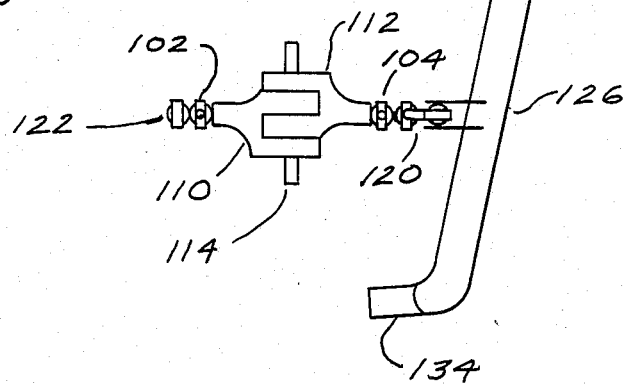
FIG. 8 is an elevational view of one of the pair of handlebars.

The components which actuate and control the direction of the steering assembly will next be described. Referring to FIGS. 1 and 6–8, the steering with regard to direction is handled by two generally separate combinations of linkages. As best shown in FIG. 6, cross member 26 mounts a pair of clevises 98 and 100 which in turn receive the ends of bell crank right link 102 and bell crank left link 104. The other end of bell crank link 102 is connected to bell crank 110 while the other end of bell crank link 104 is connected to bell crank 112. Bell cranks 110 and 112 are interdigitationally mounted by a pin 114 so that both bell cranks 110 and 112 will rotate about said pin 114. The axis of said pin 114 is parallel to the axis of aforementioned steering stem 32 in the medial longitudinal plane of the cycle. It should be noted that the bell cranks are appropriately secured to a portion of the cycle frame by means of pin 114. In order to bring about movement of the bell cranks and associated linkage, each bell crank is separately connected to one of the handlebar assemblies. More particularly, as shown in FIGS. 1, 6 and 8 handlebar link 120 is connected to the free end of bell crank 110 while handlebar link 122 is connected to the free end of bell crank 112. Handlebar link 122 is connected to the handlebar leg 126 by pinch clamp 128. The upper end of handlebar leg 126 is affixed to a handlebar 130. The inner end of the handlebar 130 is provided with an apertured bearing 132 and the lower end of handlebar leg 126 is likewise equipped with an apertured bearing 134. The handlebar is rotatably mounted in the cycle frame by means of the aforesaid bearings 132 and 134. Thus each handlebar rotates about the axis defined by the aligned holes in bearings 132 and 134. Such rotation causes the handlebar link to rotate a bell crank about its vertical axis to in turn move the bell crank link connected to the cross piece 26 and thus cause the two uprights 20 and 22 to rotate about the axis defined by steering stem 32.

In view of the foregoing description it would appear that offsetting the steering and suspension axis allows one to construct a more rigid load path from the upright to the frame because the bearings and loaded members are more directly in line with the loads thereby reducing unit stresses and also eliminating torsion of the steering stem as a response to transverse loads.

The general rule is that if front suspension travel shortens wheelbase, the device is pro-dive. On that basis, the present system has 40% of the dive a standard fork has. This is somewhat less than anti-dive forks, and probably a preferred amount. More important, anti-dive which is a geometric characteristic of linkage is de-coupled from suspension, being purely a dynamic reaction. Anti-dive forks do the job by stiffening compression damping, transmitting more road shock directly to the rider. Linkage suspensions float over the rough stuff even with maximum braking.

FIG. 2 shows a basic characteristic of unequal length support arms. Castor angle changes with travel. This unavoidable change is a function of proportion of suspension elements, as is the precentage of anti-dive. Here, the proportions are chosen to (1) increase caster angle slightly with travel, especially in the more compressed portion, thus slowing steering slightly on encountering a large, possibly off-center object, and (2) allow, under full braking, enough dive to quicken steering slightly. These proportions were tailored for a fairly steady overall anti-dive response coupled with progressively more rapid caster change as compression occurs. As a by-product of minimal wheelbase change and increased caster with travel the system is now more stable under extreme suspension displacements, for both reasons above, an average caster angle of less than usual may be employed. This makes the motorcycle system more rapidly maneuverable ordinarily.

Geometrical design of steering linkage is complex. The specific claim here is that by constructing the linkage as two halves, the strains introduced by the approximate geometry are relieved; they become small motions at the ends of the handlebars. This construction also allows the mounting of the handlebar axes (a) independently of the steering axis, and (b) also at an angle to each other, as here; both for the benefit of rider stance.

Since the handlebars are independent angular motion relative each to the other may be allowed then. FIG. 6 shows how. Effective radius is the length of the right projection of bellcrank axis onto the line of centers of the handlebar link. Initial motion of the link is generally along its length. Thus moving one link forward decreases the effective radius, and the bellcrank articulates progressively more degrees per increment of linkage motion. The opposite happens on the other side. Substantially the same thing occurs as a result of the offset of the bellcrank axis, relative to the upright links. Here the effective change of radius has an opposite sign, which correspondingly compounds the above effects on both sides. By changing the transverse location of the upright ends of the steering links, the overall ratio of upright motion relative to the bellcranks is changed. Minor changes in projected length of the links are accommodated by the bellcranks and bars assuming a slightly different initial position. Thus one can design initially for a fixed specific steering "quickness", or one may design in user-adjustability without functional compromises elsewhere.

The present system eliminates virtually all bump steer. The sole condition required for eliminating it is to keep the upright linkages parallel to each other during all suspension or steering motion. This is done by mounting the bellcrank axis parallel to the upright axis. Thus there are no opposing out-of-plane components, and effective length changes caused by upright motion are no longer differential.

What is claimed is:

1. A suspension system for the front wheel of a motorcycle having a frame assembly for supporting the suspension system, said system comprising:
   a pair of upright bars, said bars having upper and lower ends and adapted to rotatably mount a wheel between their lower ends,
   brace means attached to said bars adjacent the upper ends thereof to hold the bars in spaced and parallel position,
   a parallelogram mechanism affixed to the cycle frame and to the pair of upright bars to control up and down movement and to allow rotary movement of said pair of bars,
   a pair of semi-handlebars movably mounted on the cycle frame,
   linkage means operatively connecting each semi-handlebar to the bar pair, both linkages pivoting about a common pivot pin whereby the pair of bars may be rotated by movement of either semi-handlebar independent of the other semi-handlebar,
   wherein the vertical axis of the pivot pin which is the common pivot point for both handlebar linkages is parallel to the axis of rotation of the pair of bars taken in the medial longitudinal plane of the cycle, and
   wherein each handlebar linkage comprises an arm connected to one of the handlebars, an intermediate link pivotally carried on the common pivot pin and operatively associated with the arm from the handlebar and a steering link connecting said intermediate link to the pair of bars.

2. The invention as set forth in claim 1 and wherein the lengths of the members of the parallelogram mechanism and their respective pivot points on the cycle frame and pair of bars is such that the angle of the bars with respect to the ground varies less than 1½ degrees throughout the full range of vertical travel thereof.

3. The invention as set forth in claim 2 and wherein the handlebars are mounted on the cycle frame at an angle to each other.

4. The invention as set forth in claim 3 and wherein the steering axis is displaced from the handlebar axis.

5. The invention as set forth in claim 1 and wherein the steering links are so oriented as to be parallel with each other throughout all movement of the system in suspension and steering.

6. The invention as set forth in claim 5 and wherein the intermediate link is a bell crank comprising two separate bell crank halves mounted on a common axis.

7. A suspension system for the front wheel of a motorcycle having a frame assembly for supporting the suspension system, said system comprising a pair of parallel upright bars, said bars having upper and lower ends, brace means adjacent the upper portion of said bars holding them in fixed and spaced parallel relation, front wheel support means at the lower ends of said bars, a vertically extending steering tube affixed to the aforesaid brace means with its axis equi-distant from the bars, a steering stem rotatably mounted within the steering tube said steering stem mounting first and second offset bearing members at its extremities, a lower support arm pivotally connected to the first offset bearing at the lower end of the stem, the other end of said lower support arm being pivotally secured to the cycle frame, an upper support arm pivotally fastened to the second and upper offset bearing member at one end and pivotally mounted on the cycle frame at the other end, two bell cranks having aligned openings, a pin rotatably mounting said bell crank, said pin having an axis offset from and parallel to that of the steering tube, each bell crank having a free end, a steering link connected to each free end, said steering links also being connected to the brace means on the parallel bars disposed each side of the upper offset bearing, a handlebar assembly comprising a generally horizontally positioned handlebar, a handlebar leg rigidly connected to the midpoint of said handlebar and extending downwardly therefrom, a bearing connected to the lower end of said handlebar leg and pivotally mounted on the cycle frame, a bearing on the inner end of the handlebar pivotally connecting said handlebar to the cycle frame whereby the handlebar pivots about the axis formed by the aforesaid two bearings, a leg link connecting the lower portion of the handlebar leg to the respective free end of one of the bell cranks, a second handlebar connected to the cycle frame and bell crank in the same manner as the frist handlebar whereby each of the handlebars may move relatively independent of the other and whereby rotation of a handlebar about the two aforesaid bearings through leg link causes the associated bell crank to rotate and cause its respective steering link to rotate brace means and connected bars about the axis of the steering tube to change direction of the front wheel carried thereby.

* * * * *